Sept. 22, 1925.                    W. FINCHER                    1,554,207
                                  SHAFT BEARING
                               Filed Oct. 8, 1923
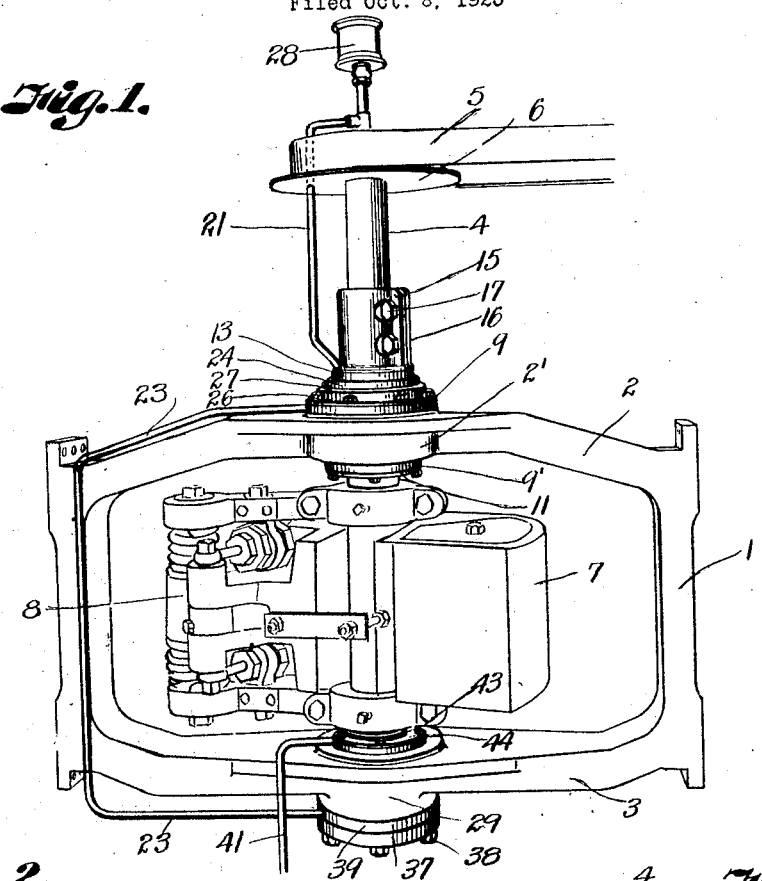
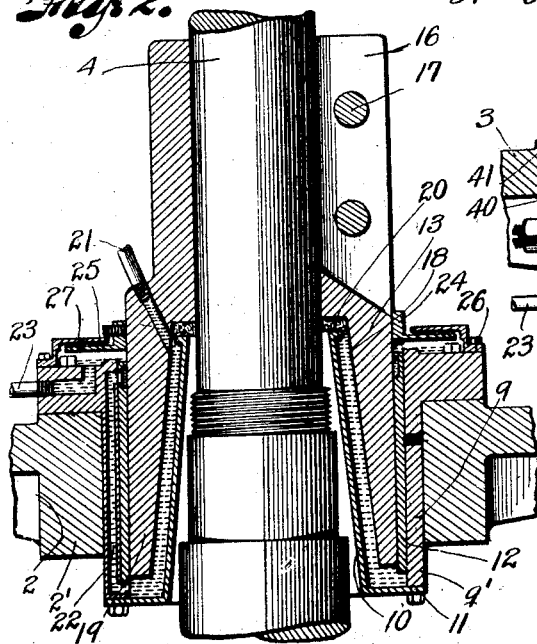
INVENTOR
Walter Fincher
BY
ATTORNEY Patented Sept. 22, 1925.

1,554,207

UNITED STATES PATENT OFFICE.

WALTER FINCHER, OF KANSAS CITY, MISSOURI.

SHAFT BEARING.

Application filed October 8, 1923. Serial No. 667,242.

*To all whom it may concern:*

Be it known that I, WALTER FINCHER, a citizen of the United States, residing at Kansas City, in the county of Jackson and State of Missouri, have invented certain new and useful Improvements in Shaft Bearings; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to bearings for vertical shafts and particularly to bearings used in connection with a drive for sifters or bolters used in flour mills and the like. The particular application of the bearing to sifters is mentioned because the bearings shown are especially adapted for use in such devices where it is found difficult to provide adequate bearings. Usually such devices are provided with ball bearings or roller bearings for the vertical shaft but due to the fact that there is an oscillatory motion imparted to the sifter or bolter the ball bearings soon wear out and their renewals are quite costly so I have provided a floating bearing which may float in a body of oil so as to work with the least amount of friction and without the necessity of rolling parts such as are employed in connection with roller or ball bearings.

My invention contemplates the provision of means whereby a rugged and efficient means is provided for constructing a drive in which a vertical shaft is employed, the essential features of the invention residing more particularly in the bearings, the manner of mounting them and efficient means of providing lubrication. The novel construction of the invention will be apparent by reference to the following description in connection with the accompanying drawings in which:

Fig. 1 is a view of the frame for supporting the bearings and the weight which causes oscillation of the frame.

Fig. 2 is a vertical longitudinal, sectional view through the upper bridge tree and the upper bearing, and Fig. 3 is a vertical sectional view through the bottom or step bearing carried by the lower bridge tree of the frame.

The one piece frame 1 is of usual construction and it is provided with an upper bridge tree 2 and a lower bridge tree 3 through which the shaft 4 extends, the shaft 4 receiving its rotative motion from a belt 5 driving the pulley 6 on shaft 4. The frame 1 is in practice fastened diagonally across a rectangular sifter or bolter suspended in an appropriate manner so as to have a floating movement and the weight 7 mounted on a shaft under the control of the spring actuated mechanism 8 causes an oscillatory movement to be imparted to the sifter, the movement being in a continuous direction, that is the sifter planetates about a variable axis. This construction however has been used prior to my invention so I make no claim as to novelty to the generic idea to imparting the above described motion to the sifter or other device which may receive its motion from the shaft. My invention resides rather in the arrangement of such a mechanism with appropriate bearings which will not wear out or be subjected to wear due to friction.

By reference to Fig. 2 it will be observed that the upper bridge tree 2 is provided with a bearing housing 2' in which is a cylindrical bearing 9 having a skirt extending below the housing and carrying a conical inner spaced wall 10 which is connected to the skirt 9' of the bearing 9 by a transverse web 11 so that an oil receiving chamber will be provided. The bearing 9 carries a cylindrical ring or wear bushing 12 against which the journal 13 on the shaft 4 may contact. The journal 13 is in the form of a sleeve, the upper portion of which is split and provided with flanges 15 and 16 which may be drawn together by the bolts 17 so that the sleeve may be clamped upon the shaft 4. The lower portion of the journal is provided with a bottom recess 18 into which is received the inner wall 10 of the oil chamber or cup. The journal is formed with a skirt 19 which extends into the oil chamber with the outer face seating against the wear ring or bushing 12 except for a thin film of oil which reduces friction, it being understood however there is to be no appreciable play between the outer face of the skirt 19 and the inner face of the bushing 12. The top of the recess 18 bears on a packing 20 which overlaps the upper edge of the inner wall 10 so that oil admitted through the pipe 21 must flow through the space between 19 and 12 through the elongated port 22 in bearing 9 and out through the pipe 23 near the upper end of the bearing and in order to prevent the oil from overflowing over the bearing, I provide a labyrinth packing consisting of ring 24 with lateral circular flange 25 overlapped by ring 26 with inwardly disposed lateral flange 27, the ring 24 being fast to the journal and the ring 26 being fast to the bearing 9. Therefore the oil will circulate through the bearing and discharge through the pipe 23 to be passed through the lower step bearing carried by the bridge tree 3. The bearing carried by the bridge tree 2 may be supplied with oil by any suitable means for example by a receptacle 28 discharging into pipe 21, see Fig. 1. The bottom bearing on the bridge tree 3 consists of the housing 29 in which is a bearing cylinder or sleeve 30 faced with the wear ring or bushing 31 co-operating with the journal 32 on the lower end of the shaft 4, the journal 32 abutting against a shoulder 33 on shaft 4 and held in place by a lock nut 34 on the threaded end of shaft 4, the lower end of shaft 4 is provided with a hardened block 35 which bears upon a step 36 mounted in a recess of the lower cap 37 adapted to be bolted to the housing ring by bolts 38 which pass through the flange 39 of the bearing 31. The bearing 31 is provided with a longitudinal passageway 40 through which oil may pass to the overflow pipe 41. Oil is supplied to the bearing through pipe 23 to form in a pool or space 42 in the bearing housing. It then may overflow through pipe 41 into a receptacle or sump provided to receive the overflow oil. The lower bearing member is provided with labyrinth packing consisting of the rings 43 and 44 similar to the rings 24 and 26 on the top bearing.

I have found in actual practice that a frame and bearing constructed in accordance with the above described construction, provides more satisfactory results than is possible with any known construction in which ball or roller bearings are provided and it is apparent that in the event that wear does take place on the bushing they can be readily renewed without renewing the remaining portions of the bearings and that the journals may be readily assembled or removed for inspection or repairs as occasion may demand. The assemblies of the bearings are exceedingly simple. In practice the bearings will give smooth operation with minimum friction loss.

What I claim and desire to secure by Letters-Patent is:

In a bearing for vertical shafts, a frame comprising upper and lower bridge trees and bearing housings in said bridge trees, a shaft support on the lower bridge tree, a shaft extending through said bearing housings and supported by said shaft support, a journal member fixed on the shaft and having an inverted cup-shaped end extending into the upper bearing housing, a bearing in the upper housing comprising a body member and a wear plate, a cupping member having a lower transverse web attached to the lower end of the body member of the bearing and a longitudinal wall spaced internally from the end of the journal member and forming an oil chamber, packing in the base of the cup-shaped journal portion against which the upper end of the longitudinal wall of the cupping member contacts, a packing ring on the upper housing member, a co-acting packing ring on the journal, means for delivering oil to the oil chamber interiorly of the journal member, the upper bearing member having a vertical port, and an overflow outlet leading from the top of said port.

In testimony whereof I affix my signature.

WALTER FINCHER.